US008392892B2

(12) United States Patent
Matsuo et al.

(10) Patent No.: US 8,392,892 B2
(45) Date of Patent: Mar. 5, 2013

(54) METHOD AND APPARATUS FOR ANALYZING APPLICATION

(75) Inventors: Akihiko Matsuo, Kawasaki (JP); Yoshiharu Maeda, Kawasaki (JP); Kohji Wada, Kawasaki (JP); Shigeo Suto, Sendai (JP)

(73) Assignee: Fujitsu Limited, Kawasaki (JP)

( * ) Notice: Subject to any disclaimer, the term of this patent is extended or adjusted under 35 U.S.C. 154(b) by 433 days.

(21) Appl. No.: 12/656,091

(22) Filed: Jan. 15, 2010

(65) Prior Publication Data

US 2010/0122240 A1    May 13, 2010

Related U.S. Application Data

(63) Continuation of application No. PCT/JP2007/064253, filed on Jul. 19, 2007.

(51) Int. Cl.
*G06F 9/44* (2006.01)
*G06F 9/45* (2006.01)
(52) U.S. Cl. ......................................... 717/131; 717/154
(58) Field of Classification Search .......... 717/124–133, 717/140–161
See application file for complete search history.

(56) References Cited

U.S. PATENT DOCUMENTS

| 5,432,942 | A | * | 7/1995 | Trainer | 717/131 |
|---|---|---|---|---|---|
| 6,041,177 | A | * | 3/2000 | Kawabe et al. | 717/125 |
| 6,110,224 | A | | 8/2000 | Kawabe et al. | |
| 6,502,235 | B1 | * | 12/2002 | Tosaka et al. | 717/126 |
| 7,181,735 | B1 | * | 2/2007 | Haraguchi et al. | 717/151 |
| 2002/0174414 | A1 | * | 11/2002 | Matsuo et al. | 717/126 |
| 2005/0086647 | A1 | * | 4/2005 | Ito et al. | 717/132 |

FOREIGN PATENT DOCUMENTS

| JP | 9-274562 | 10/1997 |
|---|---|---|
| JP | 10-116186 | 5/1998 |
| JP | 2002-229818 | 8/2002 |
| JP | 2005-100249 | 4/2005 |

OTHER PUBLICATIONS

International Search Report for PCT/JP2007/064253, mailed Aug. 21, 2007.
Japanese Office Action issued Jul. 10, 2012 in corresponding Japanese Patent Application No. 2009-523495.

\* cited by examiner

*Primary Examiner* — Christopher B Shin
(74) *Attorney, Agent, or Firm* — Staas & Halsey LLP

(57) ABSTRACT

An application analyzing method includes extracting a variable corresponding to a particular input data item and information regarding a value of the variable by analyzing a plurality of source programs constituting an application, record information of a database used by the application, and execution control information of the application, and outputting, based on the variable and the information regarding the value of the variable extracted in the extracting, information regarding a presumed value with respect to the input data item as presumed requirement information.

12 Claims, 17 Drawing Sheets

FIG.1

| FILE NAME | ITEM NAME | PRESUMED REQUIREMENT | |
|---|---|---|---|
| ORDER | BRANCH | TYPE DEFINITION | 3 DIGIT NUMERAL, 4 DIGIT NUMERAL |
| | | LOOP PROCESSING USAGE STATUS | APPLICABLE |
| | | ARRAY USAGE STATUS | 128 |
| | | LOWER LIMIT VALUE | 0 |
| | | UPPER LIMIT VALUE | 90 |
| | | COMPARISON VALUE | 99 |
| | NO | TYPE DEFINITION | 1 DIGIT NUMERAL, 1 DIGIT ALPHA-NUMERAL |
| | | LOOP PROCESSING USAGE STATUS | NOT APPLICABLE |
| | | ARRAY USAGE STATUS | NOT APPLICABLE |
| | | LOWER LIMIT VALUE | NOT APPLICABLE |
| | | UPPER LIMIT VALUE | NOT APPLICABLE |
| | | COMPARISON VALUE | 1, 2, 3, 5 |

FIG.4

| FILE NAME | LEVEL | ITEM NAME | STARTING POSITION | SIZE | TYPE DEFINITION | PARENT ITEM NAME |
|---|---|---|---|---|---|---|
| ORDER | 01 | ORDER-REC | 0 | 18 | GROUP | |
| ORDER | 03 | NO | 0 | 2 | 2 DIGIT ALPHA-NUMERAL | ORDER-REC |
| ORDER | 03 | BRANCH | 2 | 3 | 3 DIGIT ALPHA-NUMERAL | ORDER-REC |
| ORDER | 03 | ITEMINFO | 5 | 13 | GROUP | ORDER-REC |
| ORDER | 05 | ITEMNO | 5 | 5 | 5 DIGIT ALPHA-NUMERAL | ITEMINFO |
| ORDER | 05 | NUMBER | 10 | 8 | 8 DIGIT ALPHA-NUMERAL | ITEMINFO |

FIG.5

| PROGRAM | I/O | FILE |
|---|---|---|
| PG1 | IN | ORDER |
| PG1 | OUT | &&WORK |
| PG2 | IN | ORDER |
| PG2 | OUT | JB2WK |
| PG3 | IN | ORDER |
| PG3 | IN | &&WORK |
| PG3 | OUT | DELIVERY |
| PG3 | OUT | DISPATCH |
| PG4 | IN | &&JB2WK |
| PG4 | OUT | DISPATCH |

FIG.8

| FILE | ITEM NAME | INCONSISTENCY |
|---|---|---|
| ORDER | BRANCH | 3 DIGIT NUMERAL, 4 DIGIT NUMERAL |
| &&JB2WORK | STOCK | 7 DIGIT NUMERAL, 5 DIGIT NUMERAL |

FIG.9

| FILE | ITEM NAME | CURRENT UPPER LIMIT |
|---|---|---|
| ORDER | BRANCH | 90 |
| STOCK | WAREHOUSENO | 20 |

FIG.10

| |
|---|
| 0 TO 89: SMALL-SCALE MODIFICATION (ESSENTIALLY NO CHANGE, VERIFICATION ONLY) |
| 90 TO 127: MEDIUM-SCALE MODIFICATION (REWRITING OF CONSTANT VALUES REQUIRED) |
| 128 TO 999: LARGE-SCALE MODIFICATION (REWRITING OF ITEM DEFINITIONS REQUIRED) |
| 1000 AND ABOVE: LARGE-SCALE MODIFICATION (REWRITING OF DATABASE REQUIRED) |
| POSSIBILITY OF INCREASE IN PROCESSING TIME IN RESPONSE TO INCREASE IN VALUES |

FIG.12

| MODIFICATION SCALE | RANGE OF VALUES OF INPUT DATA ITEM "BRANCH" |
|---|---|
| SMALL-SCALE MODIFICATION (VERIFICATION ONLY) | 0<=BRANCH<90 |
| MEDIUM-SCALE MODIFICATION (REWRITING OF CONSTANT VALUES) | 90<=BRANCH<=128 |
| LARGE-SCALE MODIFICATION (CHANGE IN TYPE DEFINITIONS OR CONVERSION OF DB REQUIRED) | BRANCH<0, BRANCH>128 |
| REMARK | USED IN LOOP PROCESSING |

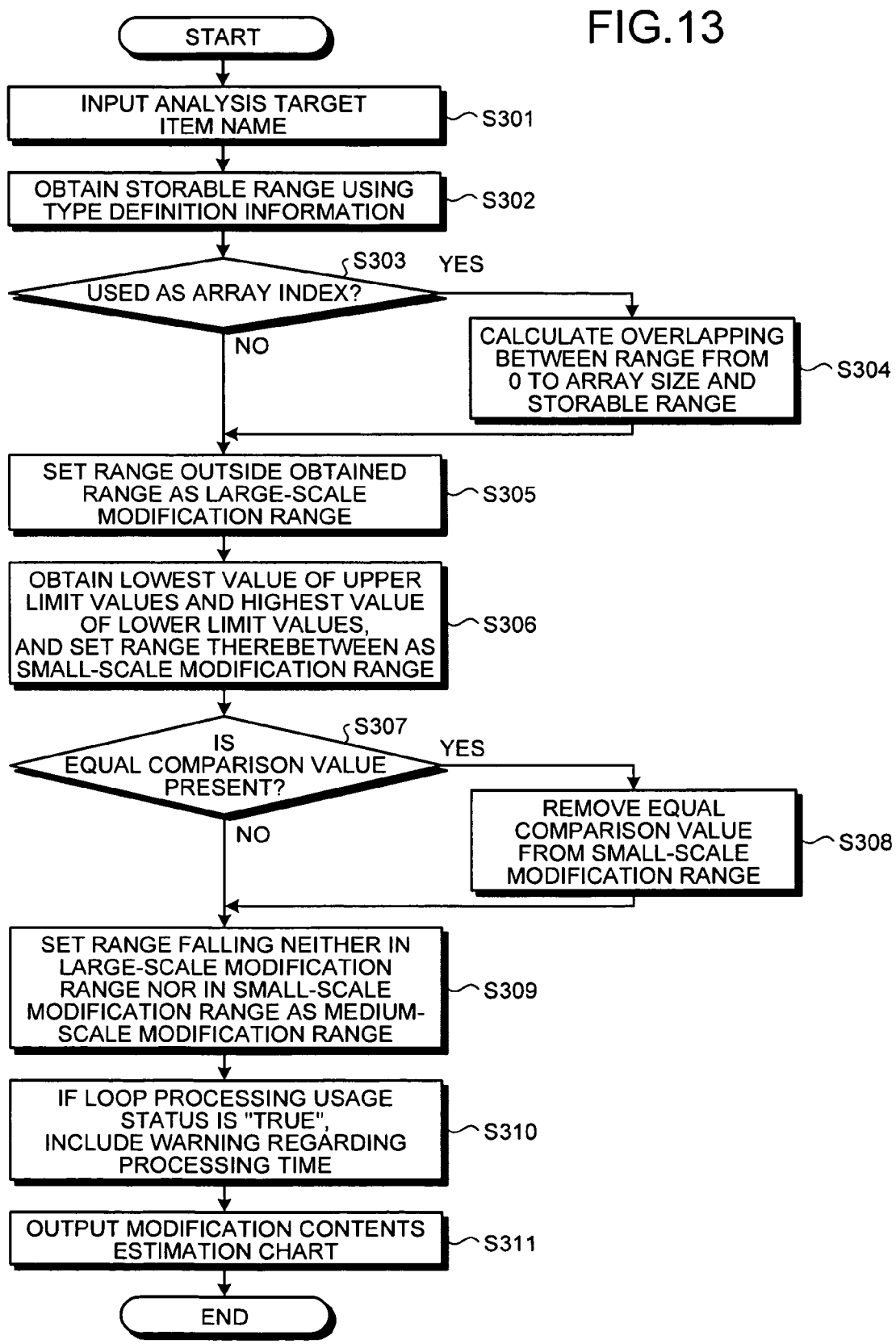

FIG.14

| MODIFICATION SCALE | RANGE OF VALUES OF INPUT DATA ITEM "BRANCH" | TIMING OF NECESSARY MODIFICATION (CURRENT UPPER LIMIT: 40, ANNUAL INCREASE RATE: 80) |
|---|---|---|
| SMALL-SCALE MODIFICATION (VERIFICATION ONLY) | 0<=BRANCH<90 | |
| MEDIUM-SCALE MODIFICATION (REWRITING OF CONSTANT VALUES) | 90<=BRANCH<=128 | 7.5 MONTHS LATER |
| LARGE-SCALE MODIFICATION (CHANGE IN TYPE DEFINITIONS OR CONVERSION OF DB REQUIRED) | BRANCH<0, BRANCH>128 | 13.2 MONTHS LATER |
| REMARK | USED IN LOOP PROCESSING | |

FIG.17

PROGRAM1 (PG1.COB)
FD INREC COPY ORDER.
01 W-BRANCH PIC 9(3).
......
READ INREC.
......
MOVE BRANCH TO W-BRANCH.
IF (W-BRANCH > 90) THEN
  GO TO DATA-ERR.
END-IF
EVALUATE NO
  WHEN 1

PROGRAM2 (PG2.COB)
FD INREC COPY ORDER.
01 W-BRANCH PIC 9(3).
......
READ INREC.
......
MOVE BRANCH TO W-BRANCH.
IF (W-BRANCH = '99') THEN
  GO TO INET-SALES.
END-IF.
IF (W-BRANCH > 90) THEN
  GO TO DATA-ERR.
END-IF.
......

PROGRAM3 (PG3.COB)
FD INREC COPY ORDER.
01 STOCKREC.
03 ZCODE PIC 9(3).
03 WAREHOUSENO PIC 9(2).
......
READ INREC.
......
READ STOCKREC AT END GO TO ZEND.
  IF ZCODE = BRANCH GO TO
    ARRANGEMENT.
END-READ.
......

PROGRAM4 (PG4.COB)
FD I-REC.
01 WORKREC.
03 BRANCH PIC 9(3).
03 STOCK PIC 9(5).
......
01 STOCKTBL PIC 9(5) OCCURS 128.
......
READ I-REC.
......
IF (STOCKTBL (BRANCH) > STOCK) THEN
  GO TO SHIPPING-ARRANGEMENT.
END-IF.
......

RECORD DEFINITIONS (ORDER.CBL)
01 ORDER-REC.
03 NO PIC X(2).
03 BRANCH PIC X(3).
03 ITEMINFO.
05 ITEMNO PIC 9(5).
05 NUMBER PIC 9(8).
......

JOB1 (JOB1.JCL)
STEP1 EXEC PGM=PG1
INFILE1 DD DSN=ORDER
OUTWORK DD DSN=&&WORK

STEP2 EXEC PGM=PG3
INFILE1 DD DSN=ORDER
INWORK DD DSN=&&WORK
OUTFILE1 DD DSN=DERIVERY
OUTFILE2 DD DSN=DISPATCH

JOB2 (JOB2.JCL)
STEP1 EXEC PGM=PG2
INFILE1 DD DSN=ORDER
OUTWORK DD DSN=&&JB2WK

STEP2 EXEC PGM=PG4
INWORK DD DNS=&&JB2WK
OUTFILE1 DD DSN=DISPATCH

FIG.19

| SUBJECT OF PRESUMPTION | PRESUMPTION DETAILS |
|---|---|
| ALL PROGRAMS, DATABASE | DIGIT COUNT OF ITEM: 3 OR 4 |
| PG1, PG2 | VERIFICATION OF UPPER LIMIT VALUE AT 90 |
| PG2 | 99: USED FOR INTERNET SHOPPING |
| PG3 | BRANCH OFFICE CODES AFFECTING LOOP PROCESSING |
| PG4 | 128: SIZE OF BRANCH OFFICE TABLE |

FIG.20

| |
|---|
| ·FOR 90 AND ABOVE, CHANGE IN CONSTANT OF UPPER LIMIT VERIFICATION REQUIRED |
| ·FOR 99 AND ABOVE, CHANGE IN INTERNET SHOPPING CODE REQUIRED |
| ·FOR 128 AND ABOVE, EXPANSION OF ARRAY SIZE REQUIRED |
| ·FOR 1000 AND ABOVE, EXPANSION OF STORED FIGURES REQUIRED |
| ·COUNTERMEASURE REQUIRED AGAINST INCREASE IN LOOP PROCESSING TIME ATTRIBUTED TO INCREASE IN VALUES |

METHOD AND APPARATUS FOR ANALYZING APPLICATION

CROSS-REFERENCE TO RELATED APPLICATION(S)

This application is a continuation of International Application No. PCT/JP2007/064253, filed on Jul. 19, 2007, the entire contents of which are incorporated herein by reference.

FIELD

The embodiments discussed herein are directed to a method and an apparatus for analyzing source information of an application and providing maintenance supporting information.

BACKGROUND

An application that is developed with the purpose of systemizing the core business activities of an enterprise includes large-scale programs and is developed by spending a substantial number of man months. Moreover, such an application has to be maintained/executed over a long period of time. Thus, along with the need for high quality output, such an application is characterized by frequent modifications that are attributed to the changes in business activities of the corresponding enterprise.

The issues regarding maintenance of such a business application include the point that it is difficult to estimate the magnitude to which programs need to be upgraded due to the changes in business activities. For example, assume that an increase in the number of branch offices prompts modification of a program or conversion of items in a database. In that case, a substantial number of man-hours are required for maintenance. Consequently, there rises a possibility that the system support gets delayed thereby leading to delays in doing the business. That may cause serious problems.

Typically, in regard to the maintenance of a business application, it is often the case that the specification documents created at the time of program development are not necessarily pertinent to the existing state of affairs. In such a case, there are various commonly-used techniques such as analyzing programs with a tool and generating documents such as section structure diagrams or subroutine call relation diagrams in an automatic manner, and searching sentences or variables that are affected by particular variables with the use of an effect searching tool.

For example, consider a case when an application including four programs as illustrated in FIG. 16 is developed on the presumption that the number of branch offices is not more than 50. The exemplary source code of each program in that application is illustrated in FIG. 17. Then, in response to a change that the number of branch offices is going to increase, assume that an existing effect searching tool is used. In that case, if starting items for tracking are specified in each program, then a variable "BRANCH" that has values of branch office codes and the sentences including the variable "BRANCH" are highlighted as illustrated in FIG. 18.

Meanwhile, as a program analyzing technology, Japanese Laid-open Patent Publication No. 09-274562 discloses a technology in which a single program is analyzed such that the location at which a branch sentence to an error processing unit and an IF sentence are in a pair is extracted and then a constraint condition for variables is obtained using the decision condition at that location.

However, automatically generated documents represent only the static structure of the program or only enable extraction of a list of sentences or variables that are affected by particular variables. Thus, only by looking at that result, it is difficult to determine the type of input data presumed by the application or the effect that would occur in response to a change in the input data.

For example, with regard to the result illustrated in FIG. 18, a person has to confirm the contents of the result in order to figure out the assumptions made by the programs with respect to the branch office codes. Moreover, in order to determine whether all affected portions need to be upgraded, it is necessary to individually check each line of the vast search result. Therefore, the above-described technology alone cannot provide correct estimation of the magnitude of upgrading. That makes it necessary for an administrator, who has the knowledge of business activities, to separately create a list of presumed requirements as illustrated in FIG. 19. The task of creating a list of presumed requirements weighs heavily on the administrator. Herein, a list of presumed requirements is a list including values that an application presumes to be in the input data.

Moreover, while evaluating the upgrading content regarding changes in the branch office codes, the upgrading content for each change differs according to the magnitude of that change as illustrated in FIG. 20. Naturally, the workload of evaluating the upgrading content for each change is substantially different. Since the upgrading content needs to be evaluated manually, that task also weighs heavily on the maintenance site.

SUMMARY

According to an aspect of an embodiment of the invention, an application analyzing method includes extracting a variable corresponding to a particular input data item and information regarding a value of the variable by analyzing a plurality of source programs constituting an application, record information of a database used by the application, and execution control information of the application, and outputting, based on the variable and the information regarding the value of the variable extracted in the extracting, information regarding a presumed value with respect to the input data item as presumed requirement information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a list of presumed requirements output by an application analyzing apparatus according to a first embodiment;

FIG. 4 is a schematic diagram of an exemplary file/DB layout table;

FIG. 5 is a schematic diagram of an exemplary program-file/DB association table;

FIG. 8 is a schematic diagram of an exemplary output of inconsistent items;

FIG. 9 is a schematic diagram of exemplary output of loop processing usage items;

FIG. 10 is a schematic diagram of exemplary application modification estimation in response to changes in the value range of input data items;

FIG. 12 is a schematic diagram of an exemplary modification contents estimation chart;

FIG. 13 is a flowchart for explaining a sequence of operations performed by a modification contents estimating unit;

FIG. 14 is a schematic diagram of an example of a modification contents estimation chart in which the estimation result of timing of necessary modification is included;

FIG. 17 is a schematic diagram of an example of source programs, record information, and JCL description of an application;

FIG. 19 is a schematic diagram of exemplary presumptions corresponding to branch office codes inside an application; and FIG. 20 is a schematic diagram of an example of changes in upgrading contents of an application in response to an increase in the number of branch offices.

DESCRIPTION OF EMBODIMENT(S)

Figure 2:
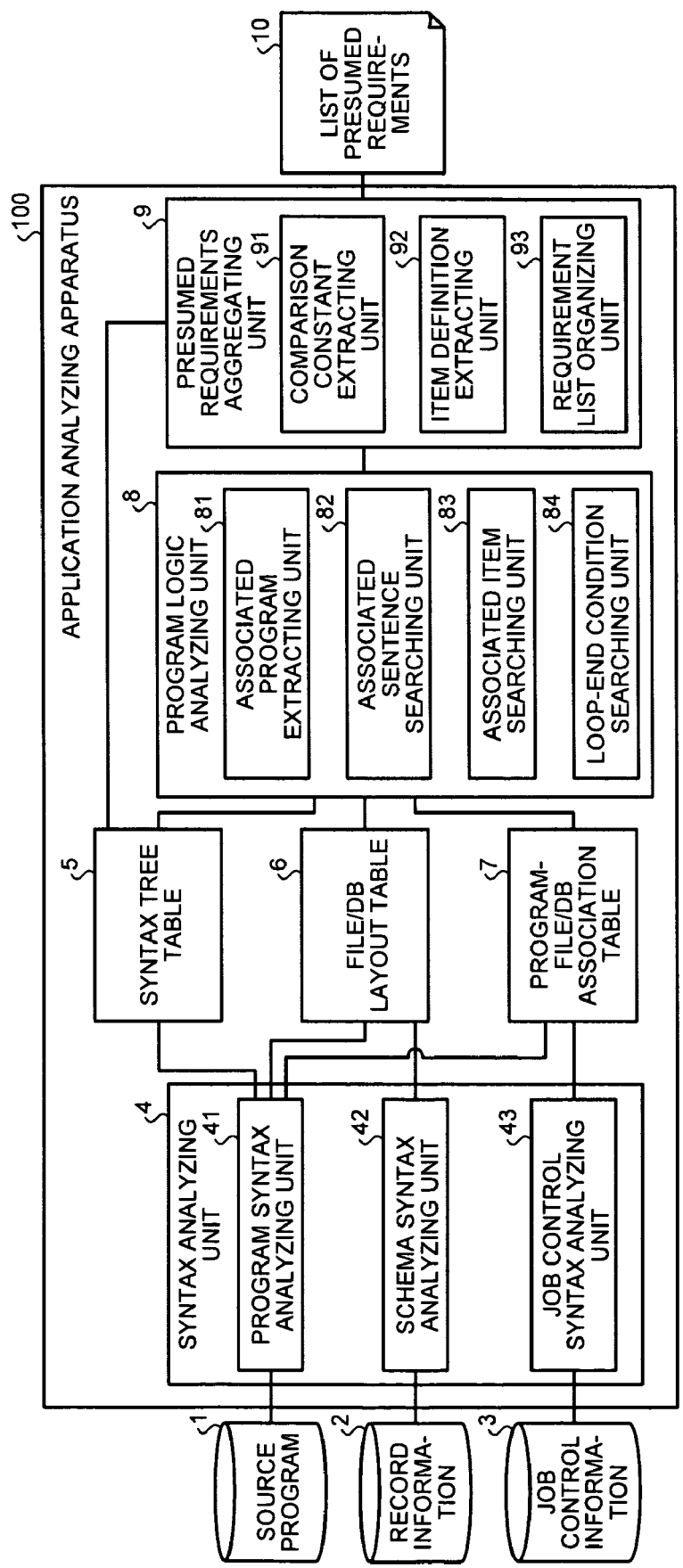
FIG. 2 is a functional block diagram of a configuration of the application analyzing apparatus according to the first embodiment.

Preferred embodiments of the present invention will be explained with reference to accompanying drawings. Herein, although the description is given with an emphasis on a case of applying the present invention for an application created in COBOL, the present invention is not limited to those embodiments.

[a] First Embodiment

Firstly, the description is given about a list of presumed requirements output by an application analyzing apparatus according a first embodiment. The application analyzing apparatus according to the first embodiment extracts programs that load a file or a database in which input data items of interest (hereinafter referred to as "target items") are stored. Then, with respect to each program, the application analyzing apparatus performs an effect search with a variable in the input record corresponding to each target item as a starting point. At that time, instead of only tracking the variables of impact destinations; the application analyzing apparatus extracts the data type or the digit count of variables of impact sources/impact destinations, compared/substituted constants, array variables using those variables as index, or locations used in loop processing control or loop escaping conditions.

Then, with respect to each target item, the application analyzing apparatus aggregates the abovementioned information and outputs that information as a list of presumed requirements for the entire system. FIG. 1 is a list of presumed requirements output by the application analyzing apparatus according to the first embodiment. As illustrated in FIG. 1, for each target item, the list of presumed requirements includes the fields of type definition, loop processing usage status, an array usage status, a lower limit value, an upper limit value, and a comparison value. Herein, the loop processing usage status is used to indicate the usage as a variable in the loop processing control or the usage in a loop escaping condition sentence. Similarly, the array usage status is used to indicate the usage as an array index. When used as an index, the array usage status indicates the array size.

By referring to the list of presumed requirements and the projection regarding future changes in the input data (e.g., existence of a plan to increase the number of branch offices by about 20 in three years), the administrator is able to determine whether future updates in the programs are necessary. That enables the administrator to perform maintenance in a planned manner.

Moreover, by referring to the list of presumed requirements, the administrator can readily figure out whether there is variability in the type definition of variables posted therein. As a result, it becomes possible to find out problems such as cancellation of significant digits while posting that may lead to a potential failure. Furthermore, in the case of changing the value range of a variable used in the loop processing control, the administrator is able to determine whether there is a sudden increase in the processing time in response to the change in value.

Given below is the description of a configuration of the application analyzing apparatus according to the first embodiment. FIG. 2 is a functional block diagram of a configuration of the application analyzing apparatus according to the first embodiment. As illustrated in FIG. 2, an application analyzing apparatus 100 includes a syntax analyzing unit 4, a syntax tree table 5, a file/DB layout table 6, a program-file/DB association table 7, a program logic analyzing unit 8, and a presumed requirements aggregating unit 9.

The syntax analyzing unit 4 is a processing unit that analyzes the source information constituting the application. That is, the syntax analyzing unit 4 analyzes a source program 1, record information 2, and job control information 3, and stores the analysis result in the syntax tree table 5, the file/DB layout table 6, and the program-file/DB association table 7. The syntax analyzing unit 4 includes a program syntax analyzing unit 41, a schema syntax analyzing unit 42, and a job control syntax analyzing unit 43.

The program syntax analyzing unit 41 is a processing unit that performs syntax analysis on the source program 1, creates a syntax tree, and stores the syntax tree in the syntax tree table 5. The schema syntax analyzing unit 42 analyzes the record information 2 of files and stores record layouts of the files in the file/DB layout table 6. The job control syntax analyzing unit 43 analyzes the job control information 3 and stores the relation between the programs and the files in the program-file/DB association table 7.

Figure 3:
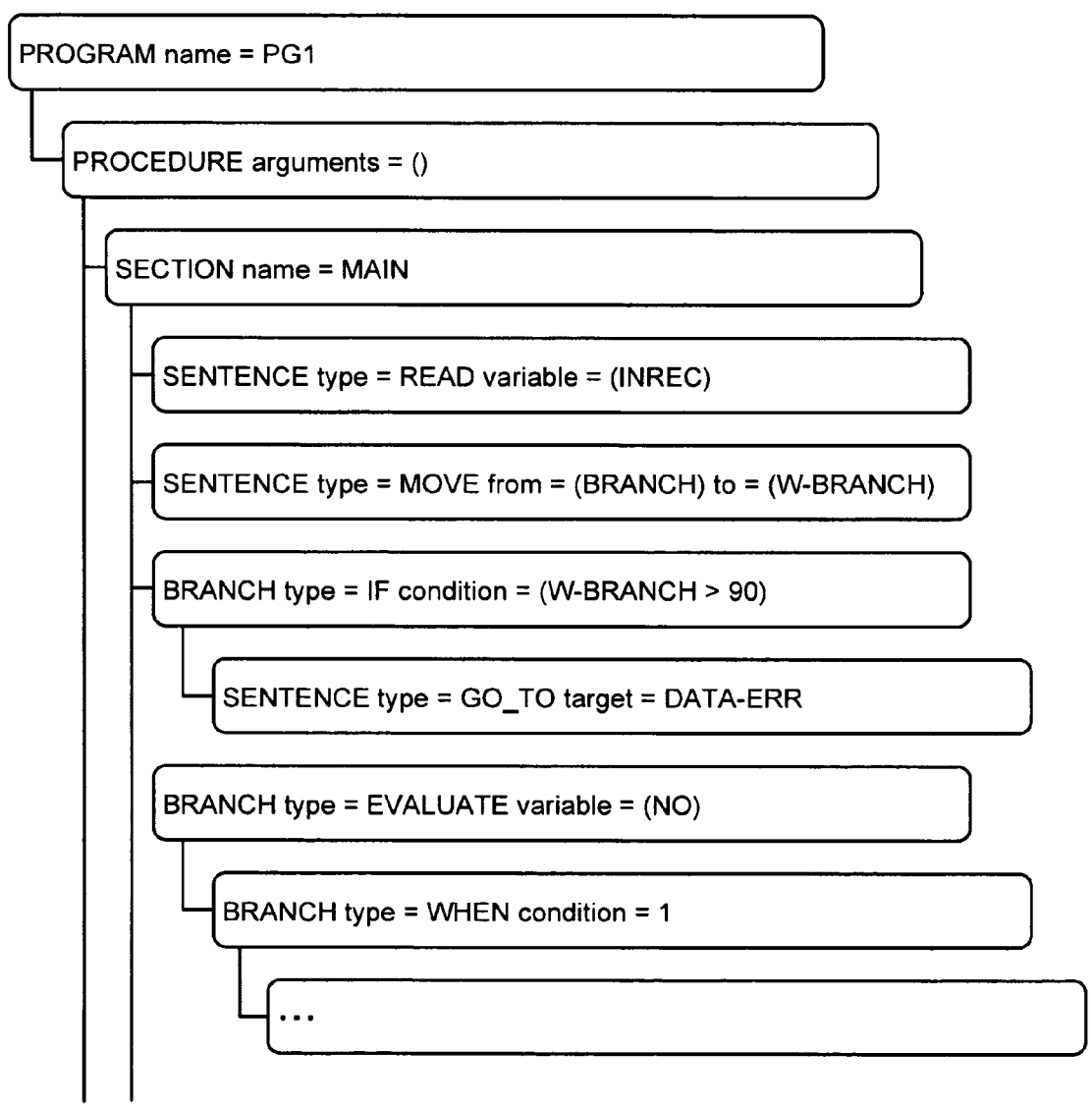
FIG. 3 is a schematic diagram of an exemplary syntax tree stored in a syntax tree table.

The syntax tree table 5 is a table in which the syntax tree created by the program syntax analyzing unit 41 is stored. FIG. 3 is a schematic diagram of an exemplary syntax tree stored in the syntax tree table 5. In FIG. 3, a syntax tree of a COBOL program is illustrated and the program structure is represented as a tree structure.

The file/DB layout table 6 is a table in which the record layouts created by the schema syntax analyzing unit 42 are stored. FIG. 4 is a schematic diagram of an example of the file/DB layout table 6. As illustrated in FIG. 4, for each data item, the file/DB layout table 6 includes the fields of file name, level, item name, starting position, size, type definition, and parent item name.

The program-file/DB association table 7 is a table in which the relation between the programs and the files analyzed by the job control syntax analyzing unit 43 is stored. FIG. 5 is a schematic diagram of an example of the program-file/DB association table 7. As illustrated in FIG. 5, the program-file/DB association table 7 includes the input-output relation of the programs and the files.

The program logic analyzing unit 8 is a processing unit that refers to the syntax tree table 5, the file/DB layout table 6, and the program-file/DB association table 7, and extracts variables corresponding to the target items and also extracts information that indicates whether the extracted variables are used in the loop processing control or used in loop escaping conditions. The program logic analyzing unit 8 includes an associated program extracting unit 81, an associated sentence searching unit 82, an associated item searching unit 83, and a loop-end condition searching unit 84.

The associated program extracting unit 81 is a processing unit that refers to the program-file/DB association table 7 and extracts a program that uses files including the target items as input. The associated sentence searching unit 82 is a processing unit that refers to the file/DB layout table 6; obtains the positions of the target items; obtains variables corresponding to those positions from the syntax tree of the programs extracted by the associated program extracting unit 81 as target variables; and searches the syntax tree, with the target variables as the starting points, for sentences related to the values of the target variables.

The associated item searching unit 83 is a processing unit that, when the sentences searched by the associated sentence searching unit 82 have substitution effect on other variables, adds variables of substitution destinations as target variables that are used by the associated sentence searching unit 82 to search for the sentences from the syntax tree. Moreover, when the values of the target variables are posted in output records, the associated item searching unit 83 obtains files corresponding to those records and sets those files as target files that are used by the associated program extracting unit 81 to extract programs.

The loop-end condition searching unit 84 is a processing unit that determines whether the sentences searched by the associated sentence searching unit 82 are loop processing control sentences or loop escaping condition sentences and, when a sentence is a loop processing control sentence or a loop processing usage flag for the corresponding target item to "true". Thus, when a sentence searched by the associated sentence searching unit 82 is determined to be a loop processing control sentence or a loop escaping condition sentence, the loop-end condition searching unit 84 sets the loop processing usage flag for the corresponding target item to "true". Because of that, the loop processing usage status can be indicated in a list of presumed requirements 10.

The presumed requirements aggregating unit 9 is a processing unit that creates and outputs the list of presumed requirements 10 based on the information analyzed by the program logic analyzing unit 8. The presumed requirements aggregating unit 9 includes a comparison constant extracting unit 91, an item definition extracting unit 92, and a requirement list organizing unit 93.

The comparison constant extracting unit 91 is a processing unit that searches for and extracts constants that perform magnitude comparison and equivalence comparison with the target item regarding the sentences extracted by the program logic analyzing unit 8. That is, the comparison constant extracting unit 91 searches for and extracts constants that perform magnitude comparison and equivalence comparison with respect to the target variables.

The item definition extracting unit 92 is a processing unit that extracts the type definition of the target items, that is, extracts the type definition of the target variables. Moreover, the item definition extracting unit 92 searches for sentences in which the target items, that is, the target variables are used as array index values and then extracts the array size from array definition information.

The requirement list organizing unit 93 is a processing unit that creates and outputs the list of presumed requirements 10 illustrated in FIG. 1 based on the information extracted by the comparison constant extracting unit 91 and the item definition extracting unit 92 and based on the loop processing usage flags.

Figure 6:
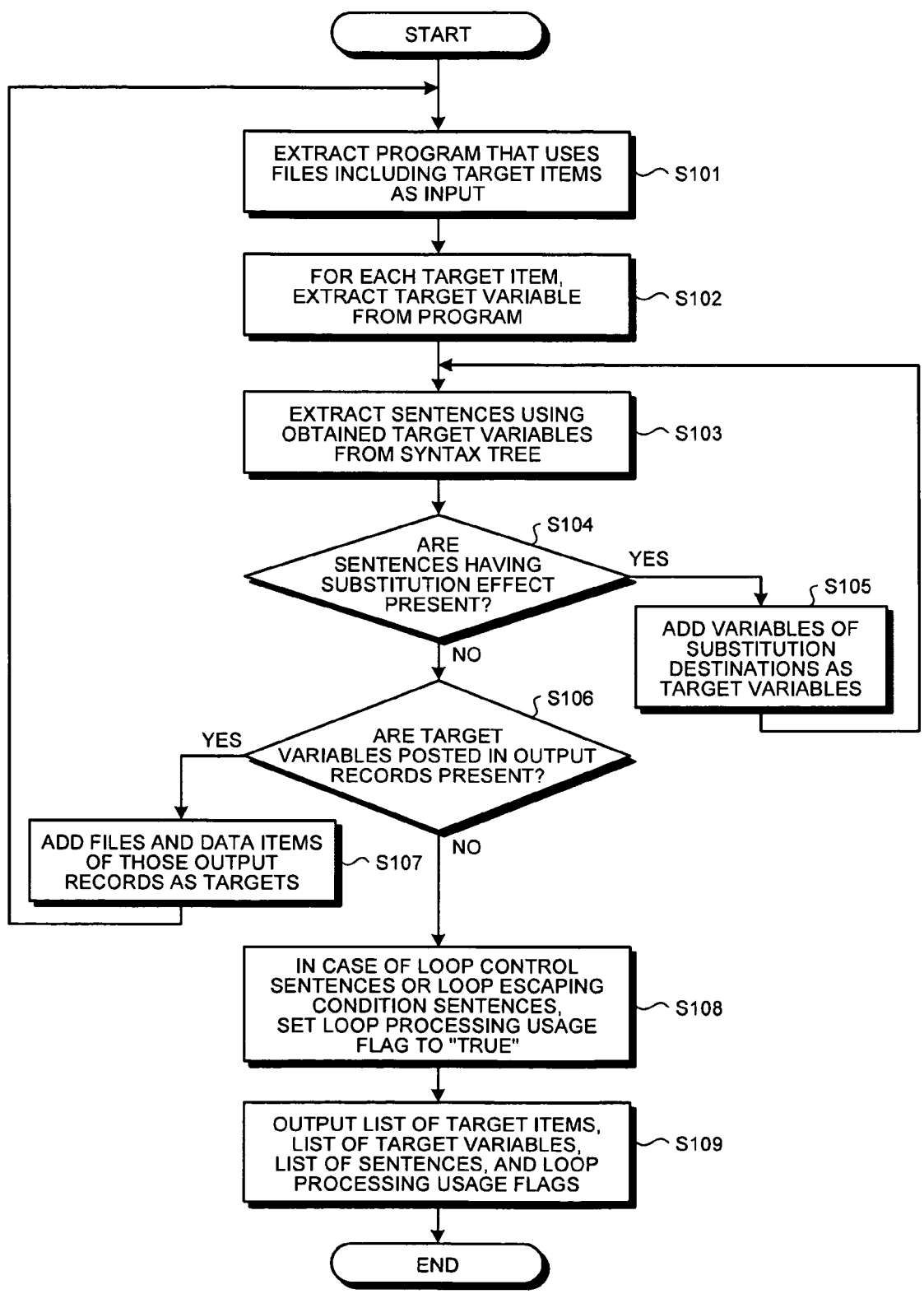
FIG. 6 is a flowchart for explaining a sequence of operations performed by a program logic analyzing unit.

Given below is the sequence of operations performed by the program logic analyzing unit 8. FIG. 6 is a flowchart for explaining the sequence of operations performed by the program logic analyzing unit 8. As illustrated in FIG. 6, first, the associated program extracting unit 81 refers to the program-file/DB association table 7 and extracts a program that uses files including the target items as input (Step S101).

Then, with respect to each target item, the associated sentence searching unit 82 obtains the position of the record layout from the file/DB layout table 6 and obtains a variable corresponding to that position in the program as a target variable from the syntax tree (Step S102). The associated sentence searching unit 82 then searches the syntax tree for sentences related to the values of the obtained target variables (Step S103).

Subsequently, the associated item searching unit 83 determines whether the sentences searched by the associated sentence searching unit 82 have substitution effect to other variables (Step S104) and, in the case of having substitution effect, adds the variables of substitution destinations as target variables, because of which the same processing can be performed on the variables at the substitution destinations (Step S105). The system control then returns to Step S103.

When all sentences with substitution effect are processed, the associated item searching unit 83 determines whether the values of the target variables are posted in output records (Step S106) and, if the target variables are posted, obtains corresponding files and data items and adds them as targets for analysis (Step S107). The system then returns to Step S101 for analyzing added data items as target items.

Upon completion of processing of all sentences that have the values of the corresponding target variables posted in the output records, the loop-end condition searching unit 84 determines whether the sentences searched by the associated sentence searching unit 82 are loop processing control sentences or loop escaping condition sentences and, when a sentence is a loop processing control sentence or a loop escaping condition sentence, sets the loop processing usage flag for the corresponding target item to "true" (Step S108). Then, the program logic analyzing unit 8 outputs the list of target items, the list of target variables, the list of searched sentences, and the loop processing usage flags to the presumed requirements aggregating unit 9 (Step S109).

In this way, the program logic analyzing unit 8 searches for sentences associated to the target items and, when a searched sentence is a loop processing control sentence or a loop escaping condition sentence, sets the loop processing usage flag of the corresponding target items to "true". Because of that, the loop processing usage status can be indicated in the list of presumed requirements 10.

Figure 7:
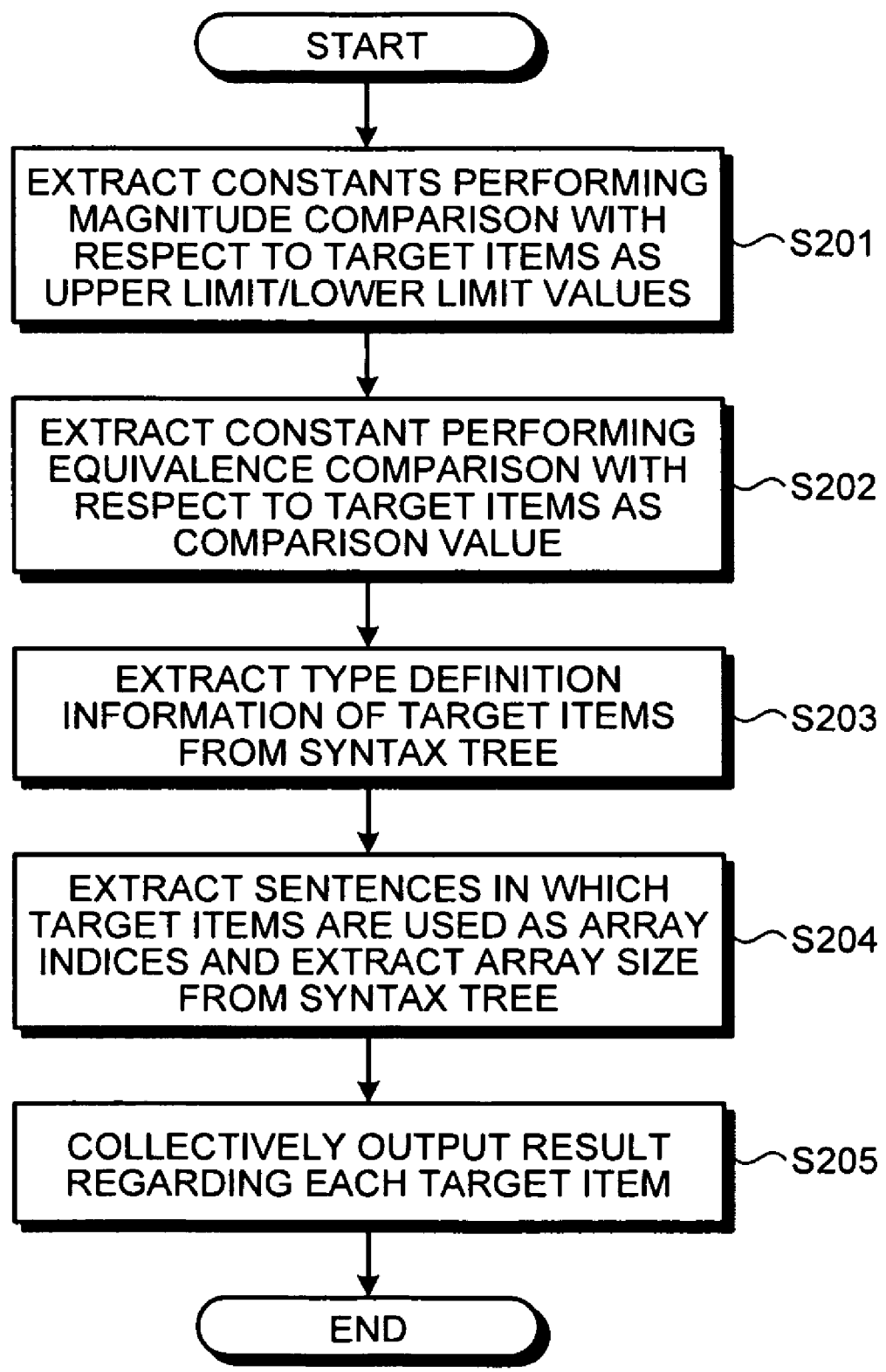
FIG. 7 is a flowchart for explaining a sequence of operations performed by a presumed requirements aggregating unit.

Given below is a sequence of operations performed by the presumed requirements aggregating unit 9. FIG. 7 is a flowchart for explaining a sequence of operations performed by the presumed requirements aggregating unit 9. As illustrated in FIG. 7, first, the comparison constant extracting unit 91 refers to the list of target variables and the list of sentences output by the program logic analyzing unit 8 and extracts constants that perform magnitude comparison and equivalence comparison with respect to the target items, as lower limit/upper limit values and a comparison value, respectively (Steps S201 and S202).

Then, the item definition extracting unit 92 refers to the syntax tree table 5 and the target variables output by the program logic analyzing unit 8 and extracts the type definition information of the target items from the syntax tree (Step S203). Moreover, the item definition extracting unit 92 refers to the target variables and the sentences output by the program logic analyzing unit 8 and extracts the sentences in which the target items are used as array indices and extracts the array size from the syntax tree (Step S204).

Subsequently, for each target item, the requirement list organizing unit 93 organizes the lower limit/upper limit values and the comparison value extracted by the comparison constant extracting unit 91, the type definition information and the array size extracted by the item definition extracting unit 92, and the loop processing usage flag output by the program logic analyzing unit 8, and outputs that information as the list of presumed requirements 10 (Step S205).

In this way, the list of presumed requirements 10 output by the presumed requirements aggregating unit 9 enables providing support to the analysis of effects that the changes in the value range of target variables have on the application.

As described above, in the first embodiment, the syntax analyzing unit 4 analyzes the source program 1, the record information 2, and the job control information 3 and stores the analysis result in the syntax tree table 5, the file/DB layout table 6, and the program-file/DB association table 7. The program logic analyzing unit 8 refers to the syntax tree table 5, the file/DB layout table 6, and the program-file/DB association table 7, and extracts the target variables corresponding to the target items and the associated sentences. Then, based on the target variables and the sentences extracted by the program logic analyzing unit 8, the presumed requirements aggregating unit 9 creates and outputs the list of presumed requirements 10. That enables providing support to the analysis of effects that the changes in the value range of target variables have on the application, and providing support to the planned maintenance of an application.

Moreover, in the first embodiment, the loop-end condition searching unit 84 determines whether the sentences searched by the associated sentence searching unit 82 loop processing control sentences or loop escaping condition sentences and, when a sentence is a loop processing control sentence or a loop escaping condition sentence, sets the loop processing usage flag for the corresponding target item to "true". Then, for the target items having the corresponding loop processing usage flags set to "true", the requirement list organizing unit 93 indicates the loop processing usage status as "applicable" in the list of presumed requirements 10. Because of that, the administrator is able to readily figure out whether the changes in the value range of target items leads to an increase in the processing time in connection with the loop processing.

Meanwhile, in the list of presumed requirements 10 illustrated in FIG. 1, the type definition information extracted by the item definition extracting unit 92 is indicated in its original form. However, if type definitions are different between the target variables corresponding to the target items, then that may be a program error. Thus, if different type definitions are present with respect to a particular target item in the type definition information extracted by the item definition extracting unit 92, then that particular target item can be separately output as an inconsistent item. FIG. 8 is a schematic diagram of an exemplary output of inconsistent items. In FIG. 8, the type definitions of target items "BRANCH" and "STOCK" are illustrated to be inconsistent.

Moreover, in the list of presumed requirements 10 illustrated in FIG. 1, the changes in the value range may have a substantial effect on the processing time for the input data items having the corresponding loop processing usage status as "applicable". In that regard, the information of the input data items having the loop processing usage status as "applicable" can be output as separate loop processing usage items. FIG. 9 is a schematic diagram of exemplary output of loop processing usage items. In FIG. 9, the loop processing usage items "BRANCH" and "WAREHOUSENO" are output along with the respective current upper limit values.

[b] Second Embodiment

In the first embodiment, the description is given for the case of outputting a list of presumed requirements. That list of presumed requirements is referred to at the maintenance site for estimating application modifications in response to the changes in the value range of input data items. FIG. 10 is a schematic diagram of exemplary application modification estimation in response to the changes in the value range of input data items. As illustrated in the application modification estimation in FIG. 10, the magnitude of changes in input data items is taken into consideration in estimating whether the modification is a large-scale modification that requires redesigning of data definitions, or a medium-scale modification that includes rewriting of comparison constants, or a small-scale modification in which operation checks are basically sufficient without having to perform rewriting.

Such estimation is performed manually by referring to the list of presumed requirements. However, alternatively, an application analyzing apparatus can also be configured to perform such estimation. Thus, in a second embodiment, the description is given for an application analyzing apparatus that performs application modification estimation with the use of a list of presumed requirements.

Figure 11:
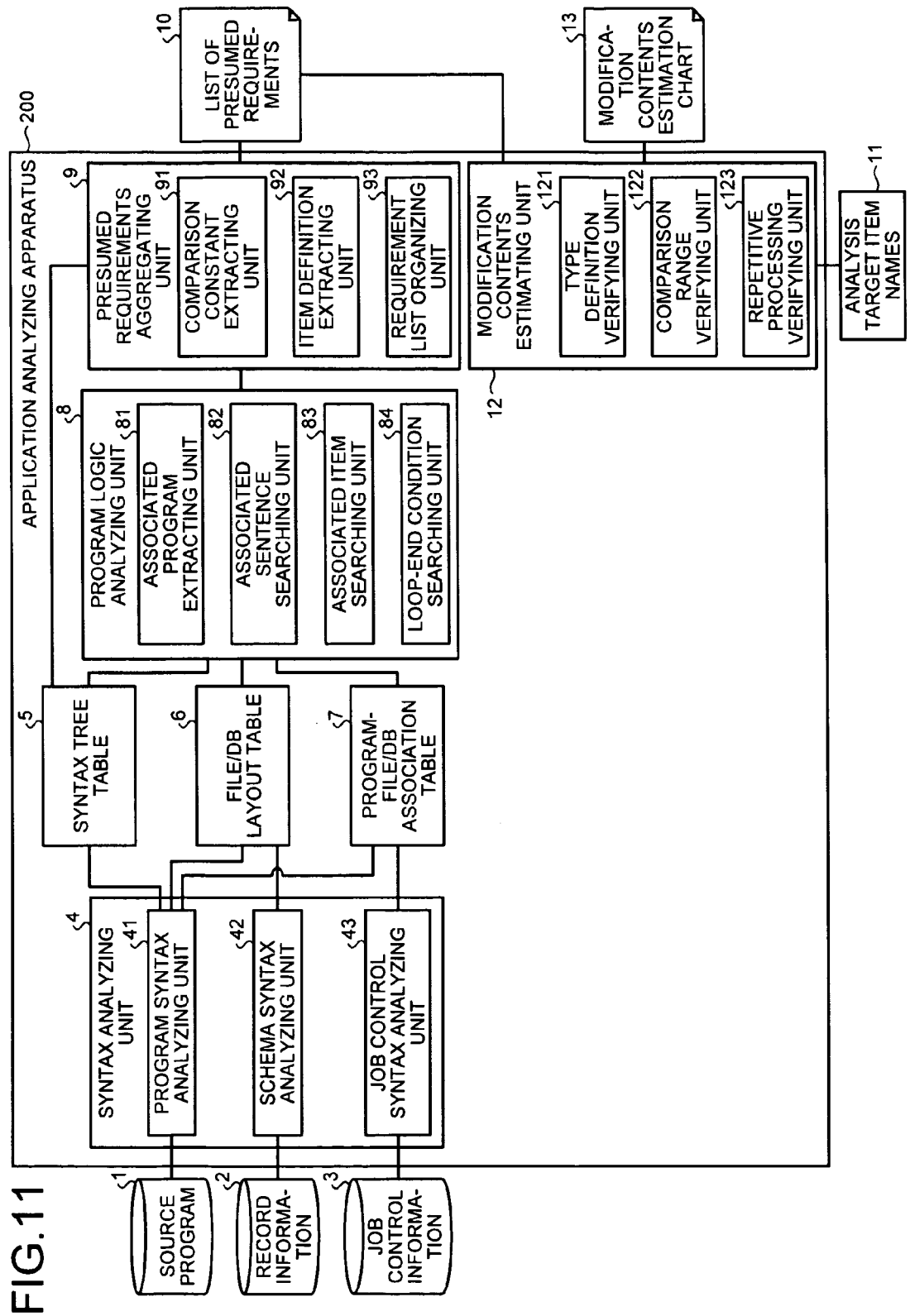
FIG. 11 is a functional block diagram of a configuration of the application analyzing apparatus according to a second embodiment.

First, a configuration of the application analyzing apparatus according to the second embodiment is explained. FIG. 11 is a functional block diagram of a configuration of the application analyzing apparatus according to the second embodiment. Herein, for the simplicity of explanation, the functional components functioning in an identical manner to those illustrated in FIG. 2 are referred to by the same reference numerals and the detailed description thereof is not repeated.

As illustrated in FIG. 11, an application analyzing apparatus 200 includes a modification contents estimating unit 12 in addition to the functional components of the application analyzing apparatus 100. The modification contents estimating unit 12 is a processing unit that receives the list of presumed requirements 10 and analysis target item names 11, and outputs a modification contents estimation chart 13. The modification contents estimating unit 12 includes a type definition verifying unit 121, a comparison range verifying unit 122, and a repetitive processing verifying unit 123. Herein, the analysis target item names 11 represent the item names of input data items that are the targets for modification contents estimation (hereinafter referred to as "analysis target items").

The type definition verifying unit 121 is a processing unit that refers to the digit count information of the type definitions of the analysis target items and calculates the range of values storable in the analysis target items.

The comparison range verifying unit 122 is a processing unit that divides the range of values calculated by the type definition verifying unit 121 into a small-scale modification range, a medium-scale modification range, and a large-scale modification range. The comparison range verifying unit 122 considers the values outside the range of upper limit values/lower limit values of the analysis target items as the range requiring large-scale modifications. However, for the items used as array indices, the comparison range verifying unit 122 obtains the overlapping between the range from 0 to the array size and the range calculated from the digit count, and considers the range outside the overlapped range as the range requiring large-scale modifications. Moreover, within the range not requiring large-scale modifications, the range falling outside the range of upper limit values/lower limit values of the analysis target items as well as the values used as comparison values are considered as the range requiring medium-scale modifications. Furthermore, the range not corresponding to the large-scale modification range and the medium-scale modification range is considered to be the range requiring small-scale modifications.

The repetitive processing verifying unit 123 is a processing unit that outputs the modification contents estimation chart 13 based on the result of divisions performed by the comparison range verifying unit 122. In addition, if an analysis target item is used in repetitive processing, then the repetitive processing verifying unit 123 includes a warning, that the processing time may increase in response to the increase in value, in the modification contents estimation chart 13.

FIG. 12 is a schematic diagram of an example of the modification contents estimation chart 13. That modification contents estimation chart 13 includes, in a corresponding manner, the ranges of values and the scales of modification for the analysis target item "BRANCH". Moreover, since the analysis target item "BRANCH" is used in the repetitive processing, a warning that the processing time may increase in response to the increase in value is included in the form of "used in loop processing" in the modification contents estimation chart 13.

Given below is the description of a sequence of operations performed by the modification contents estimating unit 12. FIG. 13 is a flowchart for explaining a sequence of operations performed by the modification contents estimating unit 12. As illustrated in FIG. 13, first, the type definition verifying unit 121 uses an analysis target item name as input (Step S301) and calculates a storable range, that is, a range of values storable in the corresponding analysis target item by referring to the digit count information of the type definition (Step S302).

Then, the comparison range verifying unit 122 determines whether that analysis target item is used as an array index (Step S303) and, if the analysis target item is used as an array index, calculates the overlapping between the range from 0 to the array size and the storable range (Step S304).

Subsequently, the comparison range verifying unit 122 sets the range outside of the calculated range as the large-scale modification range (Step S305), calculates the lowest value of the upper limit values and the highest value of the lower limit values of the analysis target item, and sets the range therebetween as the small-scale modification range (Step S306).

Moreover, the comparison range verifying unit 122 determines whether an equal comparison value corresponding to the analysis target item is present (Step S307) and, if an equal comparison value is present, removes the equal comparison value from the small-scale modification range (Step S308). Then, the comparison range verifying unit 122 sets the range falling neither in the large-scale modification range nor in the small-scale modification range as the medium-scale modification range (Step S309).

If the loop processing usage status is "applicable" for the analysis target item, then the repetitive processing verifying unit 123 includes a warning that the processing time may increase in the modification contents estimation chart 13 (Step S310) and outputs the modification contents estimation chart 13 (Step S311).

In this way, the type definition verifying unit 121 calculates the storable range of an analysis target item; the comparison range verifying unit 122 calculates the small-scale modification range, the medium-scale modification range, and the large-scale modification range of the analysis target item; and the repetitive processing verifying unit 123 outputs the modification contents estimation chart 13. That enables providing support to the modification contents estimation.

As described above in the second embodiment, the modification contents estimation chart 13 output by the modification contents estimating unit 12 enables the administrator to readily estimate the scales of modification of an application in response to the changes in the value range of input data items.

In the second embodiment, the scales of modification required in response to the changes in the value range of input data items are estimated. In addition, by referring to the current trend of increase in the value of an input data item, it is also possible to estimate and output the timing when the medium-scale modification or the large-scale modification becomes necessary. As an estimated value of the necessary timing of the medium-scale modification, the difference between the boundary value of the small-scale modification and the current value is obtained and then divided by the annual increase, and a positive value is used. Regarding the large-scale modification, the calculation can be performed in a similar manner.

FIG. 14 is a schematic diagram of an example of a modification contents estimation chart in which the estimation result of timing of necessary modification is included. In FIG. 14, for the input data item "BRANCH" having the current upper limit value of 40 and the annual increase rate of 80, the necessary timing for medium-scale modification is estimated to be: $12 \times (90-40)/80 = 7.5$ months later.

In the first and second embodiments, the description is given regarding the application analyzing apparatus. However, by implementing the configuration of the application analyzing apparatus with software, an application analyzing program having identical functions can be created. Given below is the description of a configuration of a computer that executes the application analyzing program. The application analyzing program may be stored in a computer readable storage medium such as a digital versatile disk (DVD) and distributed in the form of a medium. In the following, the application analyzing program is stored in a DVD, read out by a DVD drive, and installed in a computer.

Figure 15:
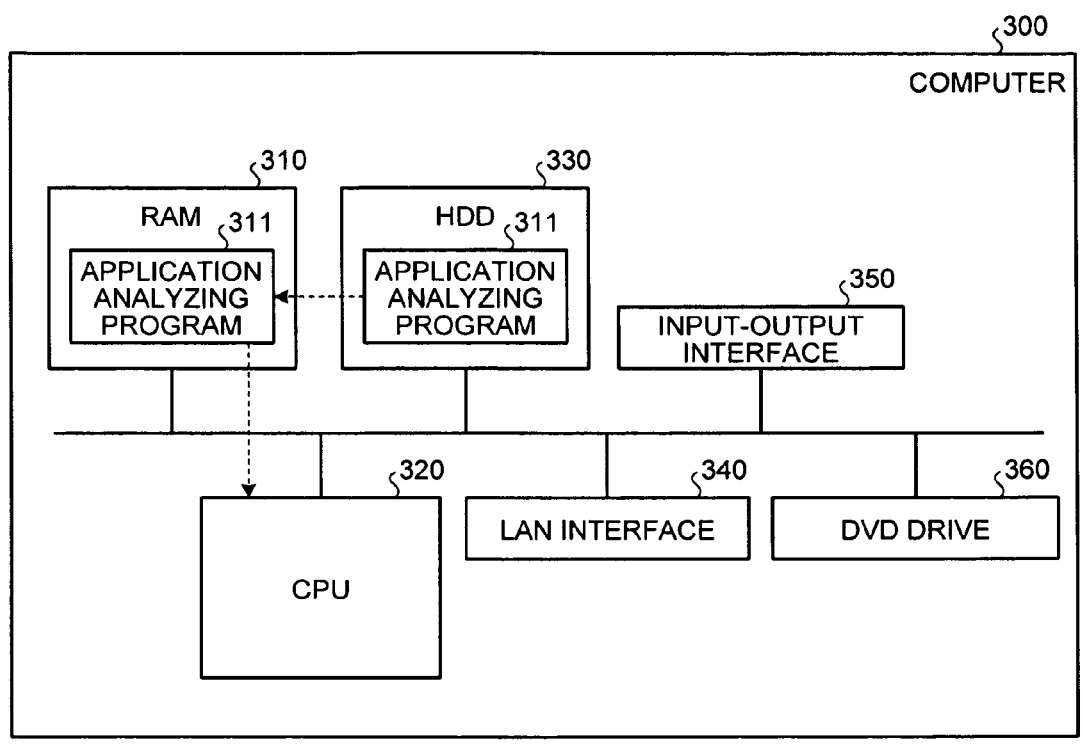
FIG. 15 is a functional block diagram of a configuration of a computer that executes an application analyzing program according to the first and the second embodiments.
Figure 16:
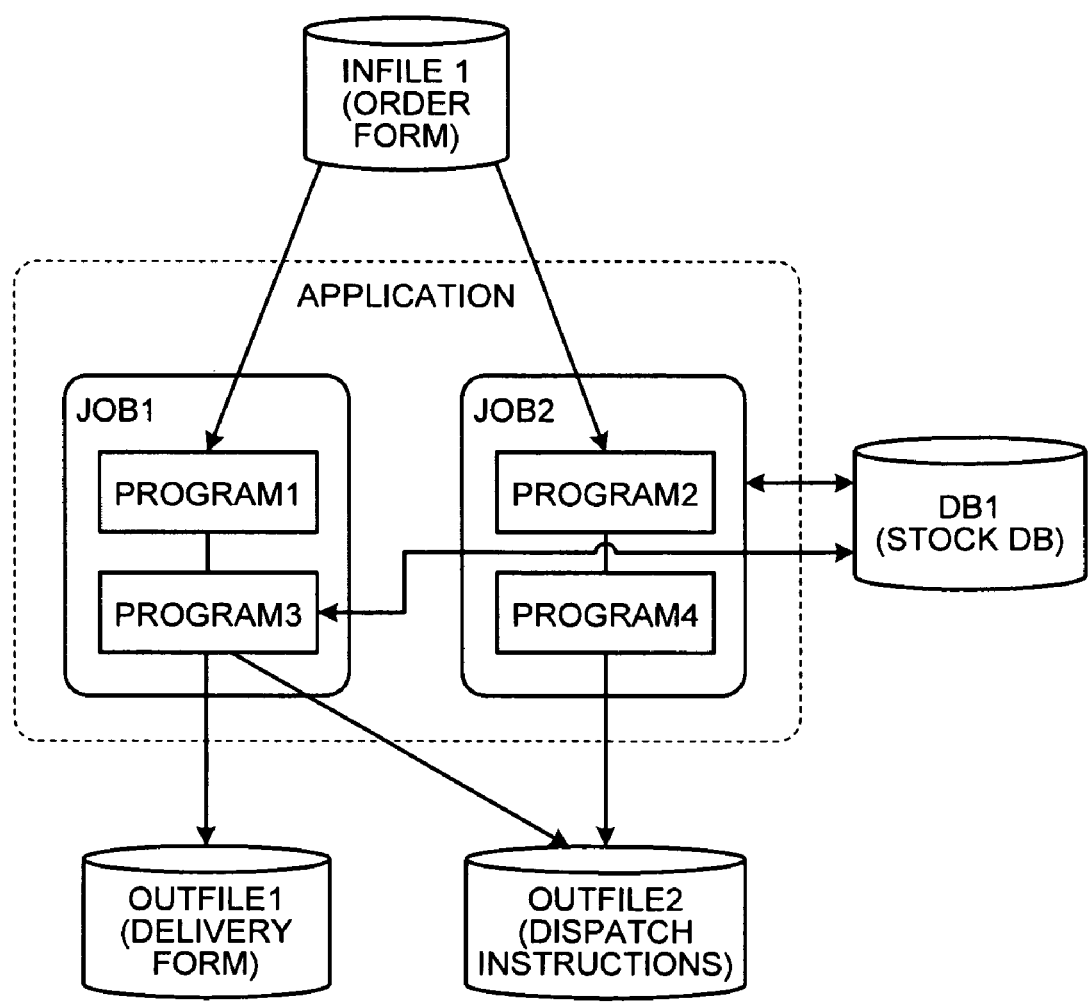
FIG. 16 is a schematic diagram of an exemplary application including a plurality of programs.
Figure 18:
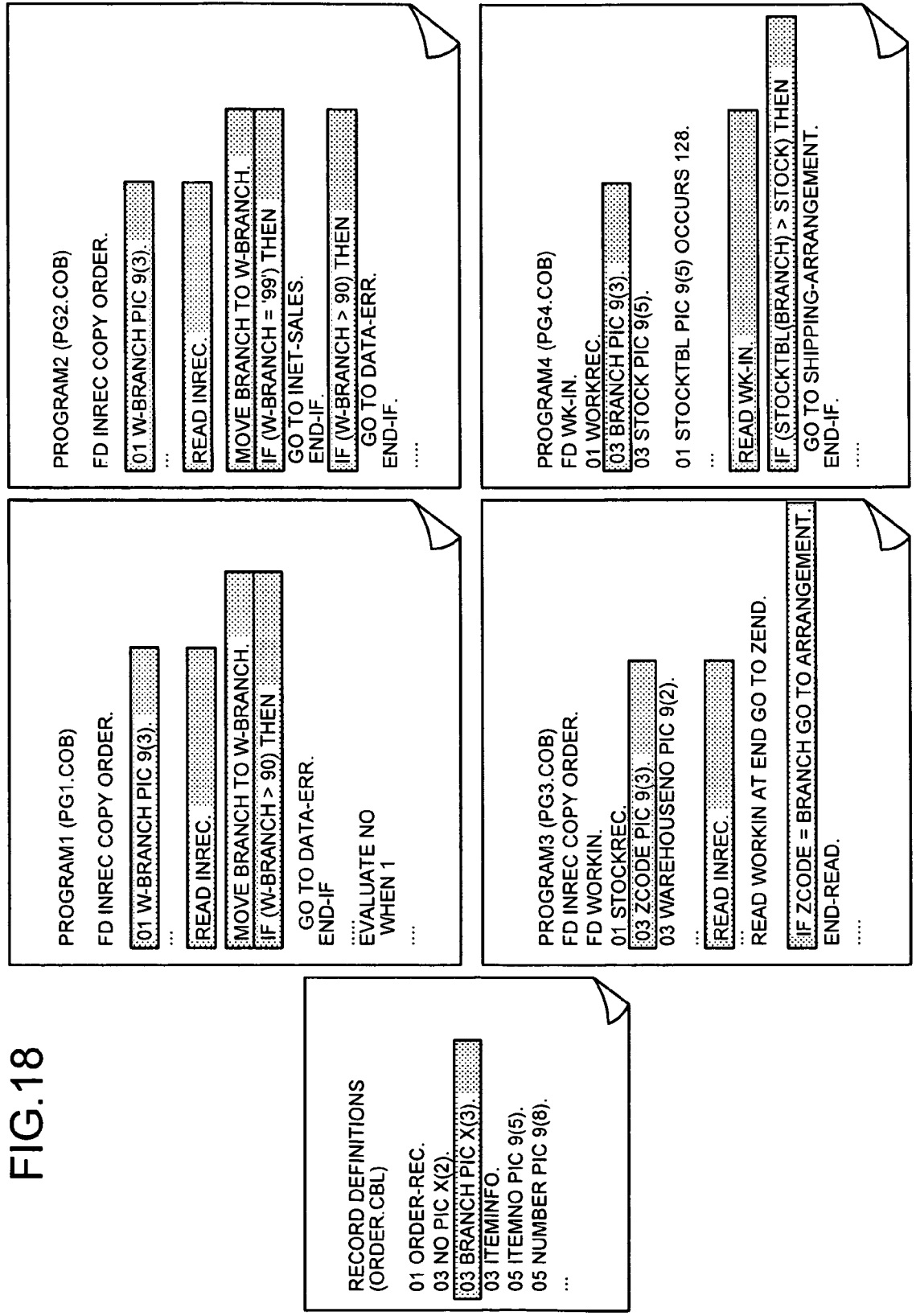
FIG. 18 is a schematic diagram of an example of analysis result by a conventional effect searching tool.

FIG. 15 is a functional block diagram of a configuration of a computer that executes the application analyzing program according to the first and the second embodiments. As illustrated in FIG. 15, a computer 300 includes a random access memory (RAM) 310, a central processing unit (CPU) 320, a hard disk drive (HDD) 330, a local area network (LAN) interface 340, an input-output interface 350, and a digital versatile disk (DVD) drive 360.

The RAM 310 is a memory used to store programs or intermediate processing results of programs. The CPU 320 is a central processing unit that reads programs from the RAM 310 and executes them. The HDD 330 is a disk unit used to store programs or data. The LAN interface 340 is an interface for connecting the computer 300 to another computer via LAN. The input-output interface 350 is an interface for connecting an input unit such as a mouse or a keyboard and a display unit. The DVD drive 360 is a unit for reading data from a DVD or writing data to a DVD.

An application analyzing program 311 that is to be executed in the computer 300 is stored in a DVD. The application analyzing program 311 is then read from the DVD by the DVD drive 360 and installed in the computer 300. Alternatively, the application analyzing program 311 can be stored in a database of another computer system that is connected via the LAN interface 340. In that case, the application analyzing program 311 is read from that database and installed in the computer 300. Upon being installed, the application analyzing program 311 is stored in the HDD 330 and loaded in the RAM 310. The CPU 320 then executes the application analyzing program 311.

According to an embodiment of the present invention, support is provided to the analysis of modification contents or modification timing of an application in response to changes in the value range of an input data item. That enables providing support to the planned maintenance of the application.

Moreover, according to an embodiment of the present invention, an administrator is able to verify in advance the increase in processing time attributed to the modifications. Because of that, the administrator can consider in advance the response against the increase in processing time.

Furthermore, according to an embodiment of the present invention, support is provided to the task of estimating modifications. That enables achieving reduction in the workload of executing/maintaining the application.

Moreover, according to an embodiment of the present invention, support is provided to the creation of a maintenance plan. That enables achieving reduction in the workload of executing/maintaining the application.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An application analyzing method comprising:
extracting a variable corresponding to a particular input data item and information regarding a value of the variable by analyzing a plurality of source programs constituting an application, record information of a database used by the application, and execution control information of the application, the variable being included in the source programs, the particular input data item being included in a record of the database, the execution information including a relation between the source programs and the database; and
outputting, based on the variable and the information regarding the value of the variable extracted at the extracting, information regarding a presumed value in the source programs with respect to the particular input data item as presumed requirement information.

2. The method according to claim 1, wherein
the extracting further includes extracting information indicating whether the variable extracted is related to loop processing control of a source program, and
the outputting further includes outputting, when the particular input data item is related to the loop processing control, a warning about a possibility that a change in a value range of the particular input data item affects processing time of the application.

3. The method according to claim 1, further comprising estimating content of program modification that accompanies a change in a value range of the particular input data item based on the presumed requirement information output at the outputting and in a corresponding manner with the value range, the program modification being modification of the source programs.

4. The method according to claim 3, further comprising estimating and outputting, based on an increase rate of a value of the particular input data item, a timing for performing the program modification according to the content of the program modification estimated at the estimating.

5. An application analyzing apparatus comprising:
a variable information extracting unit that extracts a variable corresponding to a particular input data item and information regarding a value of the variable by analyzing a plurality of source programs constituting an application, record information of a database used by the application, and execution control information of the application, the variable being included in the source programs, the particular input data item being included in a record of the database, the execution information including a relation between the source programs and the database; and
a presumed requirement information outputting unit that outputs, based on the variable and the information regarding the value of the variable extracted by the variable information extracting unit, information regarding a presumed value in the source programs with respect to the particular input data item as presumed requirement information.

6. The apparatus according to claim 5, wherein
the variable information extracting unit extracts information indicating whether the variable extracted is related to loop processing control of a source program, and
the presumed requirement information outputting unit outputs, when the particular input data item is related to the loop processing control, a warning about a possibility that a change in a value range of the particular input data item affects processing time of the application.

7. The apparatus according to claim 5, further comprising a modification contents estimating unit that estimates content of program modification that accompanies a change in a value range of the particular input data item based on the presumed requirement information output by the presumed requirement information outputting unit and in a corresponding manner with the value range, the program modification being modification of the source programs.

8. The apparatus according to claim 7, wherein
the modification contents estimating unit further estimates and outputs, based on an increase rate of a value of the particular input data item, a timing for performing the program modification according to the content of the program modification estimated.

9. A computer readable storage medium having stored therein an application analyzing program causing a computer to execute a process comprising:

extracting a variable corresponding to a particular input data item and information regarding a value of the variable by analyzing a plurality of source programs constituting an application, record information of a database used by the application, and execution control information of the application, the variable being included in the source programs, the particular input data item being included in a record of the database, the execution information including a relation between the source programs and the database; and outputting, based on the variable and the information regarding the value of the variable extracted at the extracting, information regarding a presumed value in the source programs with respect to the particular input data item as presumed requirement information.

10. The computer readable storage medium according to claim 9, wherein the extracting further includes extracting information indicating whether the variable extracted is related to loop processing control of a source program, and the outputting further includes outputting, when the particular input data item is related to the loop processing control, a warning about a possibility that a change in a value range of the particular input data item affects processing time of the application.

11. The computer readable storage medium according to claim 9, wherein the process further comprises estimating content of program modification that accompanies a change in a value range of the particular input data item based on the presumed requirement information output at the outputting and in a corresponding manner with the value range, the program modification being modification of the source programs.

12. The computer readable storage medium according to claim 11, wherein the process further comprises estimating and outputting, based on an increase rate of a value of the particular input data item, a timing for performing the program modification according to the content of the program modification estimated at the estimating.

* * * * *